March 18, 1941. C. T. ALLEN 2,235,001

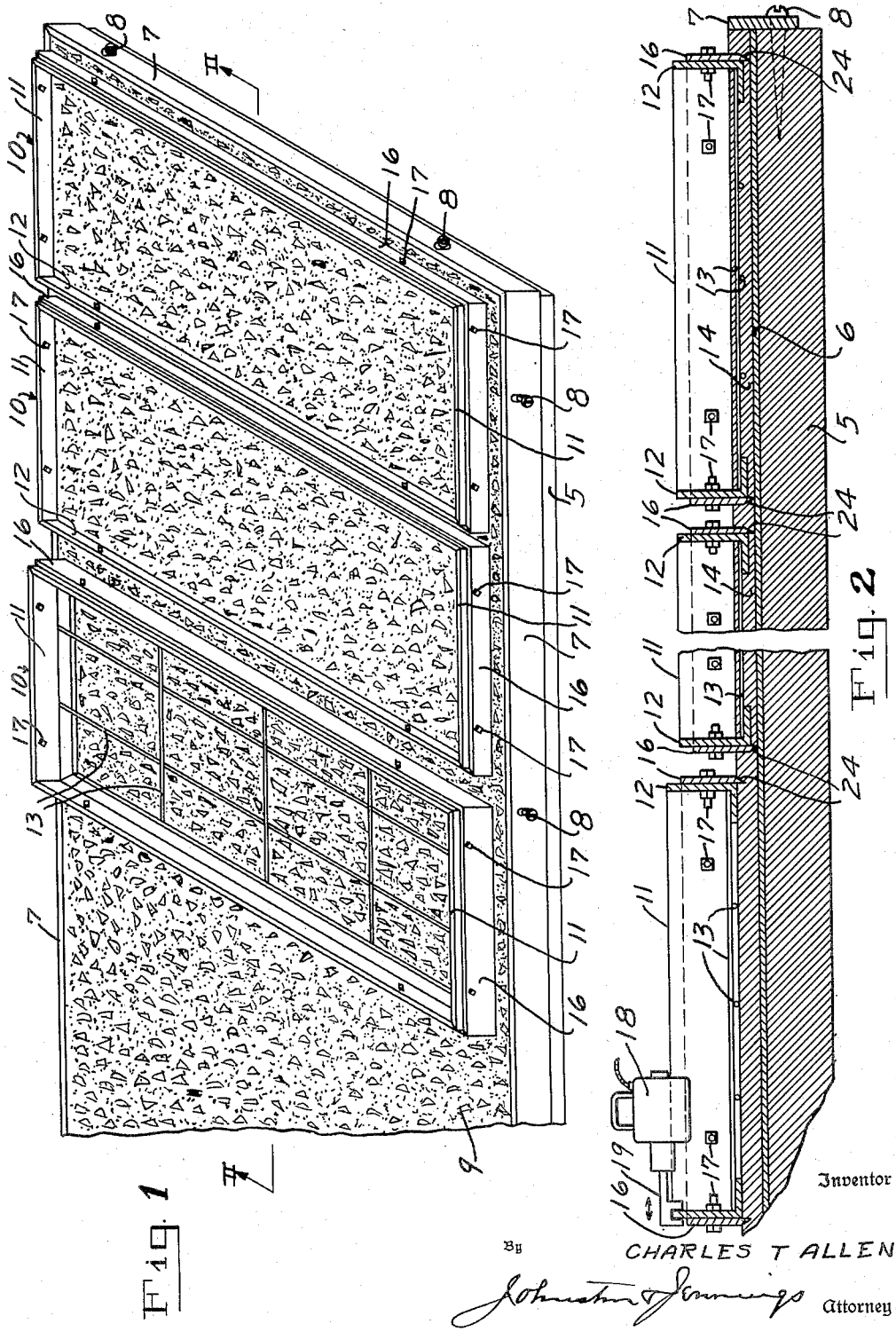

METHOD FOR THE PRODUCTION OF COMPOSITE SECTIONAL BUILDING UNITS

Filed Aug. 24, 1938 2 Sheets-Sheet 2

Inventor
CHARLES T. ALLEN

By
Attorneys

Patented Mar. 18, 1941

2,235,001

UNITED STATES PATENT OFFICE 2,235,001

METHOD FOR THE PRODUCTION OF COMPOSITE SECTIONAL BUILDING UNITS

Charles T. Allen, Birmingham, Ala.

Application August 24, 1938, Serial No. 226,519

5 Claims. (Cl. 25—155)

My invention relates to an improved method for the production of metal and reinforced concrete wall units or panels for the erection of buildings and suitable for use in walls, floors and ceilings.

The object of my invention is to provide a very simple and inexpensive method of manufacturing by unskilled labor these steel and concrete wall panels, my method being characterized by the provision of a smooth faced bed or platform adapted to receive at one time any desired number of structural metal panel frames, and having its surface previously covered with a layer of plastic material, such as concrete, cement or plaster, said frames being caused to embed themselves uniformly in the plastic layer, and left in place on the platform until the plastic has set and bonded itself to the frames.

My invention further contemplates applying, about the marginal edges of the panel frames, spacer strips which are intended to engage the platform so as both to segregate that portion of the plastic mix forming the slab component lying within the outer marignal dimensions of the frame from the mass on the platform and to stop the downward subsidence of the panel frame so as to bring it in correct spaced relation to its slab faces.

My invention is further characterized by the utilization of vibrators as the simplest and most effective means to sink the metal panel frames, carrying reinforcing elements for the plastic slab, if desired, to position in the plastic mass without objectionable disturbance of such mass.

My invention further contemplates stripping surplus plastic stock from the platform after the panel frames have been brought to position thereon, so as to avoid waste of the plastic material.

My invention will be better understood by reference to the accompanying drawings which in, Fig. 1 illustrates, in perspective view, a platform or bed having a plastic layer levelled off therein with two panel frames already sunk to operative position while a third panel frame is shown superimposed upon the plastic layer ready to be sunk to position by vibratory or equivalent action.

Fig. 2 is a cross sectional view taken on the section line II—II of Fig. 1.

Similar reference numerals refer to similar parts throughout the drawings.

Figure 3:
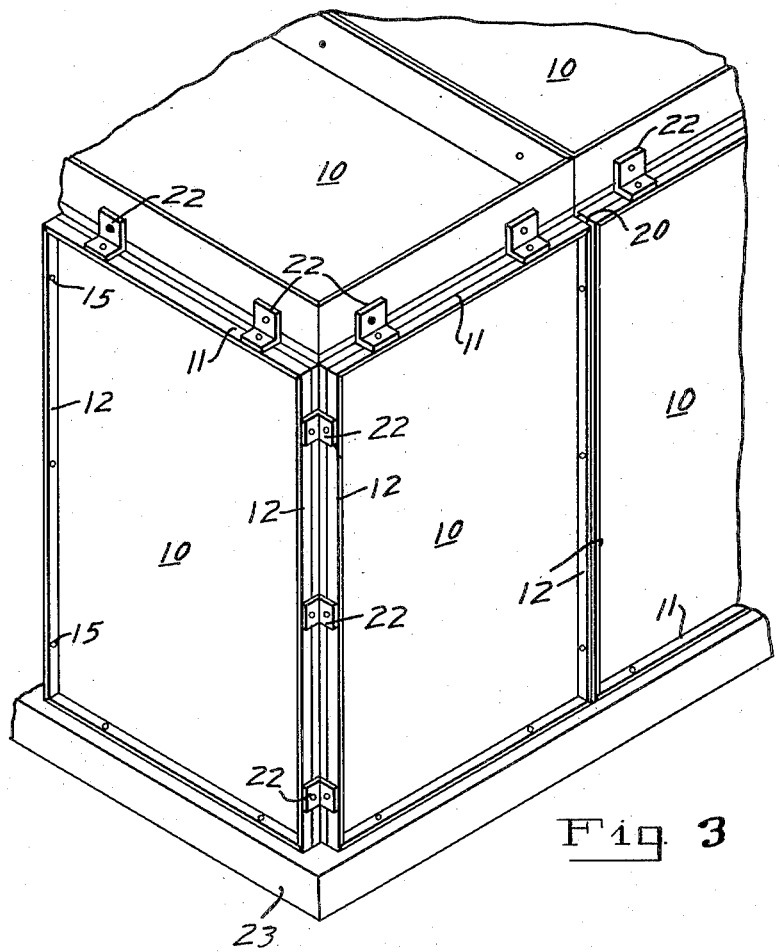
Fig. 3 shows these finished panels assembled to form walls and ceiling of a building.

In the practice of my invention as illustrated in its embodiment in the drawings aforesaid, I provide a platform comprising a suitable base 5 having thereover a smooth top surface formed preferably by metal plating 6. This platform is of considerable dimensions suitable for the simultaneous production thereon of any desired number of composite panels. I apply marginally along the side and end edges of this platform screed boards 7 having elongated slots to receive mounting screws or bolts 8 whereby the top edge of the screed boards can be set at the desired height above the platform. A mass of plastic material 9 is thereupon placed on the table and spread to a uniform thickness thereover by striking the same off level with the top of the screed boards.

The structural metal panel frames 10 are fabricated according to specifications, these being typified by the construction illustrated in Fig. 1, wherein angles, or equivalent structural elements, 11 for the panel ends and 12 for the panel sides, are suitably joined together by welding or otherwise to form a structural frame of the desired shape. To the inturned flanges of these frame angles I attach any suitable reinforcing elements 13 for the concrete or plastic slab component 14 of the finished panel. The panel frame walls, about midway of their height, are provided with bolt holes 15 placed in position so that they will match to receive bolts as the panels are set up in the erection of a building. I attach through these bolt holes 15, continuously about the outside edges of the assembled panel frame, a series of narrow strip plates 16, the bottom edges of which are set to depend below the bottom edge of the frame proper to the desired distance that the inturned frame flanges are to be spaced from the under surface of the plastic layer into which they are to be embedded, as will be later described.

The upper edges of these strip plates 16 and their attaching bolts 17 stand above the level of the plastic mass on the platform, and they thus form a continuous demountable frame surrounding, and dependent from, the panel frame 10.

The left hand panel 10 appearing in Fig. 1 shows the parts described forming a panel frame that is in position ready to be assembled in its plastic component, while the other panels 10 are each shown embedded in the plastic layer, this embedding having been accomplished preferably as follows: The panel frames 10 with their strip plates attached are set down on the plastic layer 9, preferably with sufficient spacing between frames so that each will not disturb the others as it is being worked down to position on the platform. I then apply vibration as by mounting on each of these frames successively a vibrator or shaker unit such as that shown conventionally at 18, having a jaw or mounting frame 19 by means of which it can be readily applied to and disengaged from a frame 10. The action of this vibrator is to shake the frame, causing it to settle gradually with its strip plates 16 and reinforcing elements 13 until the plates make continuous contact with the platform surface 6.

When the frames have been vibrated or otherwise sunk to position in the plastic layer 9 on the platform, it will be apparent that the strip plates 16 of each frame 10 will cut out and define therein a slab 14 which covers the marginal edges of the frame and in which the frame flanges and its reinforcing elements 13 are correctly embedded, and the frames are left in place on the platform until their slab components 14 have time to set, but the plastic stock outside of the frames is gathered up and used progressively as the work proceeds. After the slabs 14 have set, their frames are lifted off the platform, their strip plates are unbolted and knocked loose, and the finished panel is ready for use. The panels preferably have applied along their outer marginal faces composition joint strips 20 which stop short of the outer slab face. These strips 20 will insure a tight joint being formed between assembled frames.

Figure 4:
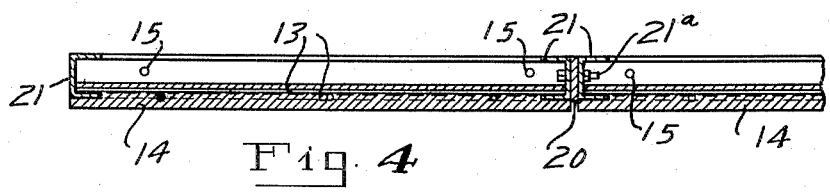
Fig. 4 is a horizontal sectional view showing the manner of jointing together channel frame panel sections to form walls, ceilings or floors of the building.

Since the structural frames will be designed according to the loads they are to bear, some may have their frames made with angles, and some with channels 21, as shown in Fig. 4, where two wall panels 10 with angle frames are shown with their channel sides connected by bolts 21 standing clear of their slabs 14. Here the panels have their slabs forming the inside wall surface disposed so that their marginal edges conceal the metal frames and no metal will be exposed. The joint strip 20 can be such that the side edges of the plastic components of adjacent panels will abut to form the inner wall surface, but if thick joint strips are used the resulting open joints left between the plastic panel edges may be filled with any suitable plastic filler to be troweled into the joints between slabs so as to give a smooth interior surface. Any desirable outside wall finish may be applied to the panel frames. At the wall corners I provide angle connectors 22 for the corner panels, and similar connectors can be used to connect wall panels to ceiling panels, as is clearly shown in Fig. 3. The wall panels at their bottom ends are suitably connected to the floor joist elements 23.

It will be at once apparent that skilled labor will not be required to strike off a plastic layer on or along the platform as the work proceeds, nor to set down the desired panel frames 10 thereon. The vibratory method of embedding the frames in the plastic layer is preferable as it will best obviate particles of the plastic mass catching under a frame so as to prevent its strip plates working down into full contact with the platform. If desired the strip plates may have a thin or even sharpened bottom edge 24 to facilitate their working fully to position on the platform. My improved type of wall panel combines its structural and plastic surface forming elements into a single unit in a novel manner; this unit has its structural component designed in accordance with engineering principles that will permit the use of stock structural shapes and will permit of these shapes widely varying in size and design to conform to different heights of walls or different spans of floor, ceiling or roof units. Further, by the provision of the stripping edge plates 24 I not only provide for the concealing of the metallic elements from exposure on the inside wall surface but I can, by varying the extension of these edge plates beyond the flange of the steel frame, meet any condition required as to thickness of slab, or protection of steel or air space between the inside and outside wall surfaces, and at the same time I can utilize the frames themselves as a means to correctly position the reinforcement provided for the plastic slab.

While I have referred to the platform surface 5 as smooth and flat, I do not desire to be restricted thereto, as it may have any desired surface configuration provided the slab 14 molded thereon can be stripped therefrom readily with its frame.

What I claim is:

1. The herein described process for the production of metal and plastic wall units, which consists in preparing a casting bed, spreading plastic material for a number of panels at a time on said bed, superimposing a plurality of metallic frame components of panels on said plastic layer, causing said frames to be sunk into said bed, and providing said frames with demountable strip plates which control their depth of penetration into the plastic layer and segregate the plastic component of each of the panels from the layer on said bed, allowing the segregated plastic to set and bond itself in the frames, then removing the frames from said bed, and detaching their strip plates.

2. The herein described process for the production of composite structural panels, which comprises fabricating the metallic frame component of a panel, spreading the plastic component in a layer, superimposing the frame on said layer, vibrating the frame to embed it in said layer, and allowing the plastic component to set and bond itself in place in the frame.

3. The process according to claim 2, in which demountable strip plates form a dependent border for the under side of the frame and serve when the frame is embedded in the plastic layer to segregate the plastic forming the slab component of the panel from surrounding layer material.

4. The herein described process for the production of composite structural panels, which comprises preparing a molding bed amply large for the simultaneous production thereon of a plurality of panels, spreading a plastic layer on said bed having the desired thickness for the slab component of the panels, fabricating metallic panel frames, attaching demountable strip plates to the marginal frame walls, seating the frames in spaced relation on said plastic layer, and causing them to embed themselves uniformly in said layer and segregate therefrom the plastic stock for forming their respective slab components, and leaving the frames in place until their plastic slabs are set.

5. The herein described process for the production of composite structural panels, which comprises preparing a molding bed amply large for the simultaneous production thereon of a plurality of panels, spreading a plastic layer on said bed having the desired thickness for the slab component of the panels, fabricating metallic panel frames with slab reinforcing elements therein, attaching demountable strip plates to the marginal frame walls, seating the frames in spaced relation on said plastic layer, and causing them by vibratory action to embed themselves uniformly in said layer and segregate therefrom the plastic stock for forming their respective slab components, removing and again spreading the plastic layer surrounding the embedded frames, leaving the frames in place on the bed until their plastic slabs are set, then removing the composite panels for the bed, and detaching their strip plates.

CHARLES T. ALLEN.